April 21, 1953     E. W. LIGHT     2,635,558
DROP BOTTOM DUMPING VEHICLE
Filed Oct. 13, 1949
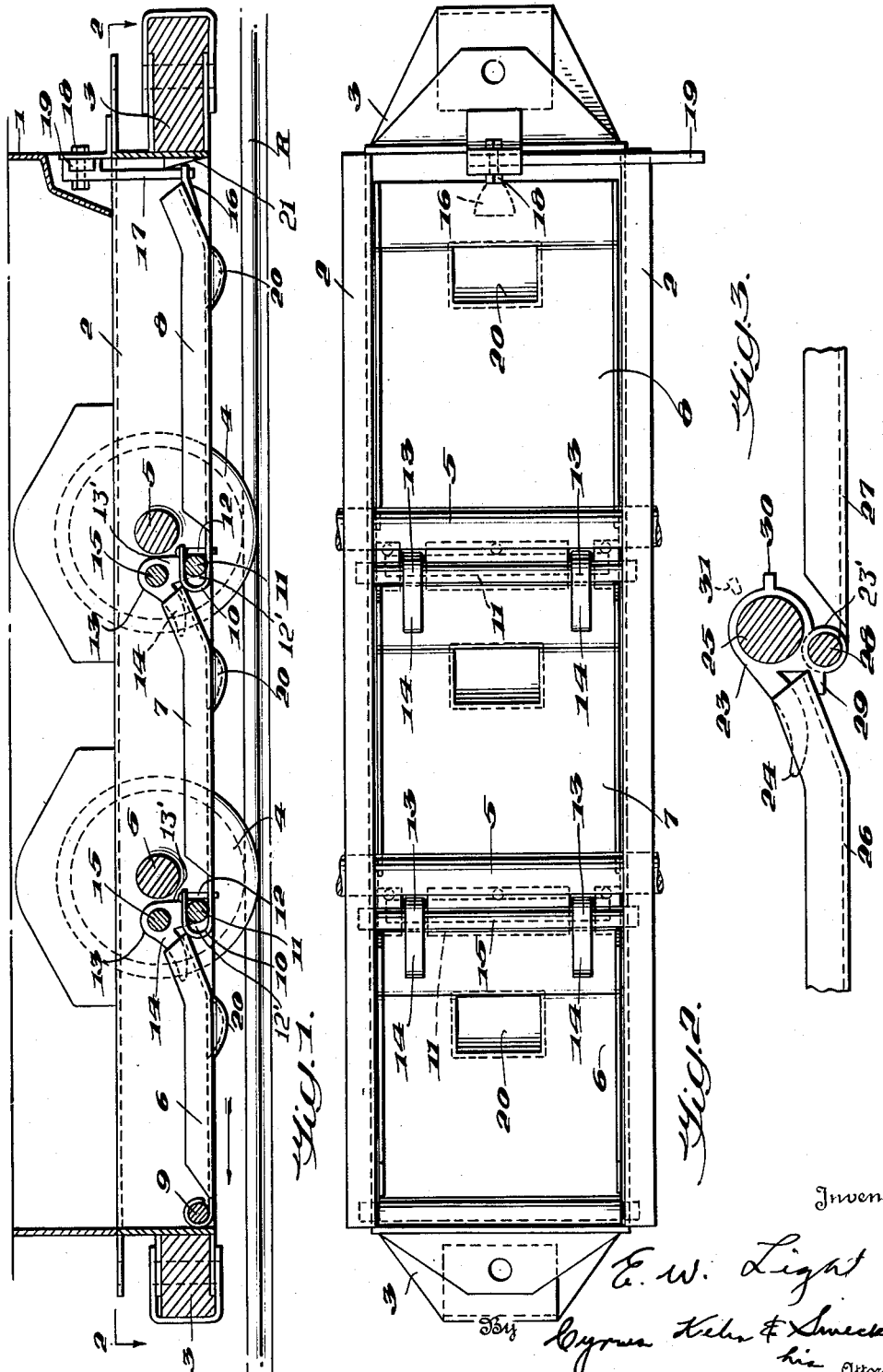

Patented Apr. 21, 1953

2,635,558

UNITED STATES PATENT OFFICE 2,635,558

DROP BOTTOM DUMPING VEHICLE

Eber W. Light, Charleston, W. Va., assignor to The Sanford Investment Company, Wilmington, Del., a corporation of Delaware Application October 13, 1949, Serial No. 121,177

6 Claims. (Cl. 105—253)

This invention relates to improvements in drop bottom dumping vehicles, of the type used particularly for transporting lading such as coal and other material from one location to another, which lading is hauled to a desired point for dumping automatically.

Mine cars as frequently used heretofore have been constructed generally of the character shown in the prior patent to Sanford, No. 2,001,471, granted May 14, 1935. Such prior cars have been constructed for dumping in one-two-three order from front to rear of the car, but this has required a bodily sliding movement of the doors succeeding the forwardmost door in order to close and latch the doors in secure relationship. Such sliding movement was accomplished by a wedging action only after all of the doors had been moved to a closed position by the engagement of the rearmost door with a wedge mounted on the car for moving these bodily lengthwise of the car into inter-engaged secure relation.

One object of this invention is to improve the door structure of drop bottom vehicles to provide improved supports and relative opening and closing movements of the doors.

Another object of this invention is to improve the construction of the car and the operation of the doors, particularly in closing movements, whereby the doors will be closed and interengaged in the one-two-three order from front to rear of the car.

The invention will simplify the closing action of the doors because only one of these need be moved at any one time. Furthermore, the shifting of each succeeding door is accomplished by the closing movement of the next forward door through a pulling action rather than a pushing action that results from the wedging of all of the doors.

Certain embodiments of this invention are illustrated in the accompanying drawings, in which:

Fig. 1 is a longitudinal sectional view, partly in elevation, showing the invention applied to a drop bottom mine car and with parts omitted;

Fig. 2 is a top plan view of the drop bottom structure of the car substantially on the line 2—2 of Fig. 1; and Fig. 3 is a detailed sectional view showing a modified form of mounting.

The invention is shown for purposes of illustration as applied to a drop bottom mine car of the character set forth in detail in the Sanford patent, No. 2,001,471, granted May 14, 1935. It may be applied, however, to other types of vehicles or conveying mechanisms wherever a plurality of drop bottom doors are desired for use and to be opened or closed by successive interengaged actions. Some of the conventional car structure is omitted from the drawings for convenience of illustration.

In the form of car illustrated, a body is designated generally by the numeral 1 having sloping side walls and end walls which form the enclosed hopper of the car. The body 1 is supported on a bottom frame structure formed by side sills 2 and combined end sills and bumpers generally indicated at 3. This frame 2—3 encloses an opening in the bottom of the car beneath the body 1 and to which the sloping sides of the latter are directed for discharge of the lading through this opening.

The car is shown as mounted upon track engaging wheels 4 by means of axles 5 which are shown as extending through the side sills 2 and have the wheels journaled thereon in the usual manner. These wheels ordinarily travel on tracks formed by rails R when the invention is applied to a mine car as illustrated.

The bottom opening of the car is normally closed by a plurality of doors generally indicated at 6, 7 and 8, which are adapted to be interengaged for successive opening and closing movements. These doors 6—8 extend transversely from side to side of the frame structure 2—3 and substantially close the opening therein.

The forward door 6 is pivotally mounted at its forward edge on a hinge rod 9 which mounts the door 6 for downward swinging movement from its closed position, as shown in Fig. 1, to an open position where it will permit discharge of the portion of the lading thereover from within the car. Each of the next succeeding doors 7 and 8 is adapted for pivotal movement, for which purpose it has a loop 10 at the forward edge thereof to receive therein a hinge rod 11 confined in the loop by pins 12. A filler 12' is interposed between the opposite side of the hinge rod 11 and the closed side of the loop 10, allowing pivotal movement of the door on the hinge rod. The filler 12' may be omitted, if desired, and any other suitable means used for hinging the door on the hinge rod or other hinge support.

Thus each of the doors 7 and 8 is held against movement horizontally relative to the hinge rod 11, but may swing downward about the axis of the hinge rod 11 to an open position for allowing discharge of the lading from within the body 1. In their closed positions each of the doors 7 and 8 has the loop 10 thereof engaging under the free edge of the next forward door to support said free edge in its raised position.

The doors may be mounted in any suitable manner on the hinge rod 11. The hinge rod 11 is shown in this embodiment as supported at the lower end of a pair of pendulum members, generally indicated at 13, one arm 13' of each member extending downward to the rod 11 while the other arm 14 thereof extends laterally thereupon substantially in the shape of a bell-crank. The arms 14 extend forwardly in overlapping relation with the free edge of the next forward door, as will be evident from Figs. 1 and 2. The pendulum members 13 are supported on a cross rod 15 that extends transversely between the side sills 2, in the form of the invention shown in Figs. 1 and 2.

The free edge of the rearward door 8 is shown as provided with a rearwardly projected trunnion 16, one or more of which may be used as desired, and in position to be engaged by a latch 17. While any suitable form of latch may be used, as desired, I have shown the latch 17 as pivotally mounted at 18 on the end structure of the car. A latch release lever is shown at 19 connected with the latch 17 and adapted to engage a tripping member located laterally outside the car for swinging the latch to release the free edge of the rearward door 8. Another form of latch that may be used is shown in Sanford Patent No. 2,399,708, dated May 7, 1946.

Upon engagement of the tripping arm 19 the latch 17 will be moved so as to release the trunnion 16. This will allow the rearward edge of the door 8 to drop about its supporting hinge rod 11 and thus fall onto the surface of the track. The frictional movement thus offered to the rearward door will cause this door to move lengthwise in a rearward direction withdrawing the loop 10 thereof from beneath the free edge of the next forward door. This action will release the door 7 and allow it to drop, which in turn will release the forward door. The doors will thus release successively and be supported by the trackway until the doors reach the opening in the trackway through which the lading is to be dumped. The doors then will discharge the lading in one-two-three order when they reach the bin or other point of discharge.

Thereafter, as the car passes continuously over the tipple the doors will engage successively with the door closing device provided in the trackway for moving them to their closed positions. Each of the doors is shown as having a dimple 20 in the under surface thereof for engaging this door closing device. The forward door 6 will be moved to its closed position, as shown in Fig. 1, and thereafter in succession the doors 7 and 8 will likewise be moved to their closed positions. As the free edge of each of these doors is moved upward it will engage the arms 14, swinging these arms upward and turning the pendulum members 13 about the hinge rod 15 and bodily moving the hinge rod 11 forward. This will cause the next succeeding door to be moved bodily forward in a horizontal direction engaging the loop edge thereof beneath the free edge of the next forward door, whereby to support said free edge and hold the forward door in its elevated position. This action will be repeated successively for each pair of doors until the rearward door 8 is closed and its trunnion 16 engaged with the latch 17, which will hold the doors closed until released.

A wedging member is shown at 21 secured to the forward face of the rearward end sill 3, having an inverse slope in position to be engaged by the trunnion 16, as the door 8 is moved to its closed position. This member is for the purpose of preventing the doors from shifting forward either when empty or loaded.

In this way the doors are moved successively to their closed and latched positions without the necessity for joint bodily movement of all of the doors in a lengthwise direction. The forward door is utilized to shift the next succeeding door to its engaged and supported position beneath the free edge of the forward door and without a wedging action and lengthwise movement of all of the doors jointly.

A modification is shown in Fig. 3 in which one or more pendulum members 23 are shown as pivotally mounted or journaled on an axle 25. Each pendulum member is provided with a forwardly directed arm 24 in position to overlie the free edge of the forward door 26. The next succeeding door 27 is pivotally mounted on a hinge rod 28 carried by the downwardly projecting arm 23' of the pendulum member 23. The door 27 has a pivotal movement relative to the rod 28, with a bodily sliding movement relative to the axis 25, in the form illustrated, as the pendulum 23 swings on the axis.

The pendulum member is provided with a lug 29 on the forward side thereof in position to engage under the free edge of the forward door 26 whenever the pendulum member is moved around its pivot by the upward movement of the arm 24. Thus the lug 29 engaging under the free edge of the door 26 will support the forward door until released. Swinging movement of the pendulum member 23 in the opposite direction is limited by a lug 30 provided thereon in position to engage a stop 31 fixed on the car, as on the side sill 2.

Otherwise than as indicated, this form of the invention functions in the same manner as described above in connection with Figs. 1 and 2.

Although the invention is described and illustrated in one form thereof together with a modification, it is recognized that other modifications and changes may be made made in the invention without departing therefrom, except as set forth in the claims.

I claim:

1. In a conveyor including a plurality of forward and rearward doors, means hingedly mounting said doors for downward swinging movement, the hinge means for the rearward door supporting said rearward door for bodily endwise movement toward and from the free edge of the forward door in closed position and having means for supporting said free edge of the forward door, and means in position overlapping said free edge of the forward door and spaced laterally appreciably from the side edges thereof and operated by the intermediate portion of said free edge portion of the forward door and operated thereby for causing movement of said supporting means into supporting engagement with said free edge upon movement of the forward door to a closed position.

2. In a dumping vehicle having a body structure and a plurality of forward and rearward drop bottom dumping doors, means hingedly mounting said doors for downward swinging movement, the hinge means for the rearward door including a cross-shaft supporting said door for bodily movement lengthwise toward and from the free edge of the forward door and having means for supporting said free edge of the forward door in closed position, and means having arms in position for actuation by the closing movement of the forward door and spaced laterally appreciably from the side edges thereof and operated by the intermediate portion of said free edge portion of the forward door for causing movement of the supporting means into supporting engagement with said free edge of the forward door on movement of the latter to a closed position.

3. In a drop bottom dumping vehicle including a body having a plurality of forward and rearward dumping doors interconnected for successive action, means for hingedly supporting the doors on the body for downwardly swinging movement, said supporting means for the rearward door including a cross-shaft on which said rearward door is hinged, a pendulum member supporting said cross-shaft and pivotally mounted for bodily movement of the cross-shaft toward and from the free edge of the forward door, said pendulum member including an arm overlapping the free edge of the forward door in closed position and spaced inwardly appreciably from the side edges thereof and actuated thereby to cause movement of the pendulum member and shaft to move the rearward door into supporting relation with the free edge of the forward door.

4. In a drop bottom dumping vehicle including a body having a plurality of forward and rearward dumping doors interconnected for successive action, means for hingedly supporting the doors on the body for downward swinging movement, said supporting means for the rearward door including a cross-shaft on which said rearward door is hinged, a pendulum member supporting said cross-shaft and pivotally mounted for bodily movement of the cross-shaft toward and from the free edge of the forward door, said pendulum member including an arm overlapping the free edge of the forward door in closed position and spaced inwardly appreciably from the side edges thereof and actuated thereby to cause movement of the pendulum member and shaft to move the rearward door into supporting relation with the free edge of the forward door, said rearward door having a loop at the forward edge thereof embracing said shaft and extending transversely relative thereto in position to engage under the free edge of the forward door.

5. In a drop bottom dumping car having a lading body and a plurality of interconnected forward and rearward drop bottom dumping doors, means mounting said doors for downward swinging movement, the mounting means for the rearward door including a transverse shaft, said rearward door having a loop formed at the forward edge thereof embracing said shaft and mounted on the shaft to support the free edge of the forward door on said loop, a plurality of pendulum members pivotally mounted on the lading body and supporting said shaft, each of said pendulum members having an arm thereon projecting forwardly in overlapping relation with the free edge of the forward door and spaced inwardly appreciably from the side edges thereof in position for engagement with the upper surface thereof for actuation thereby in closing movement of the forward door to cause endwise movement of the rearward door into a supporting position beneath the free edge of said forward door.

6. In a drop bottom dumping vehicle including a body having a plurality of forward and rearward dumping doors interconnected for successive action, means for hingedly supporting the doors on the body for downward swinging movement, said supporting means for the rearward door including a cross-shaft on which said rearward door is hinged, and a pendulum member supporting said cross-shaft and pivotally mounted for bodily movement of the cross-shaft toward and from the free edge of the forward door, said pendulum member including an arm overlapping the free edge of the forward door at a point spaced inward an appreciable distance from the adjacent lateral edge of said forward door in closed position and actuated thereby to cause movement of the pendulum member and shaft to move the rearward door into supporting relation with the free edge of the forward door.

EBER W. LIGHT.

References Cited in the file of this patent

UNITED STATES PATENTS

| Number | Name | Date |
|---|---|---|
| 1,851,695 | Dendler | Mar. 29, 1932 |
| 1,986,943 | Sanford | Jan. 8, 1935 |
| 2,286,958 | Haessler | June 16, 1942 |
| 2,542,347 | Shields et al. | Feb. 20, 1951 |